United States Patent
Samuel et al.

(10) Patent No.: US 8,456,478 B2
(45) Date of Patent: Jun. 4, 2013

(54) MICROCONTROLLER WITH INTEGRATED GRAPHICAL PROCESSING UNIT

(75) Inventors: Roshan Samuel, Chandler, AZ (US); Joseph Julicher, Queen Creek, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 1021 days.

(21) Appl. No.: 12/261,779

(22) Filed: Oct. 30, 2008

(65) Prior Publication Data

US 2010/0110085 A1    May 6, 2010

(51) Int. Cl.
| | | |
|---|---|---|
| *G06F 13/14* | (2006.01) | |
| *G06F 3/038* | (2006.01) | |
| *G06F 15/16* | (2006.01) | |
| *G06F 9/30* | (2006.01) | |
| *G06F 9/40* | (2006.01) | |
| *G09G 5/00* | (2006.01) | |

(52) U.S. Cl.
USPC ............ 345/519; 345/204; 345/502; 345/3.1; 712/204

(58) Field of Classification Search
None
See application file for complete search history.

(56) References Cited

U.S. PATENT DOCUMENTS

| | | | | |
|---|---|---|---|---|
| 5,767,866 | A | 6/1998 | Chee et al. | 345/521 |
| 5,774,131 | A * | 6/1998 | Kim | 345/503 |
| 5,826,106 | A | 10/1998 | Pang | 395/845 |
| 5,926,644 | A * | 7/1999 | Hays | 712/22 |
| 6,151,035 | A * | 11/2000 | Okada | 345/536 |
| 6,157,984 | A * | 12/2000 | Fisher et al. | 711/112 |
| 7,171,050 | B2 | 1/2007 | Kim | 382/232 |
| 7,631,309 | B2 * | 12/2009 | Wilt et al. | 718/104 |
| 7,746,350 | B1 * | 6/2010 | Danilak | 345/538 |
| 7,847,864 | B1 * | 12/2010 | Jaffe et al. | 348/724 |
| 2002/0138697 | A1 * | 9/2002 | Kanda | 711/114 |
| 2005/0068311 | A1 * | 3/2005 | Fletcher et al. | 345/211 |
| 2005/0110783 | A1 | 5/2005 | Sklovsky et al. | 345/204 |
| 2005/0237330 | A1 * | 10/2005 | Stauffer et al. | 345/531 |
| 2006/0221087 | A1 * | 10/2006 | Diard | 345/505 |
| 2008/0001934 | A1 * | 1/2008 | Wyatt | 345/204 |
| 2008/0049029 | A1 * | 2/2008 | Kurata et al. | 345/519 |
| 2008/0077771 | A1 * | 3/2008 | Guttag et al. | 712/204 |
| 2008/0094405 | A1 * | 4/2008 | Bastos et al. | 345/506 |
| 2008/0117192 | A1 * | 5/2008 | Liu et al. | 345/204 |
| 2009/0144527 | A1 * | 6/2009 | Nakata et al. | 712/221 |

OTHER PUBLICATIONS

International PCT Search Report and Written Opinion, PCT/US2009/062157, 14 pages, Mailed Feb. 19, 2010.
Talla, Deepu, et al.; "Using DaVinci Technology for Digital Video Devices", IEEE Computer Society, vol. 40, No. 10; pp. 53-61, Oct. 1, 2007.
European First Office Action, European Patent Application No. 09 764 349.8-1243, 7 pages, Apr. 16, 2012.
Epson: S1D13505 Embedded RAMDAC LCD/CRT Controller, Graphics S1D13505, pp. 1-2, Oct. 2001.
Epson: Exceed Your Vision, S1D13705 Embedded Memory LCD Controller, Hardware Functional Specification, Document No. X27A-A-001-10, pp. 1-86, Sep. 18, 2007.

* cited by examiner

*Primary Examiner* — Ke Xiao
*Assistant Examiner* — Donna Ricks
(74) *Attorney, Agent, or Firm* — King & Spalding L.L.P.

(57) ABSTRACT

A microcontroller with an integrated special instruction processing unit and a programmable cycle state machine. The special instruction processing unit allows offloading of intensive processing of output data and the programmable cycle state machine minimizes the amount of customized, off chip circuitry necessary to connect the microcontroller to an external display.

20 Claims, 12 Drawing Sheets

MICROCONTROLLER WITH INTEGRATED GRAPHICAL PROCESSING UNIT

RELATED APPLICATIONS

This application relates to the subject matter of U.S. patent application Ser. No. 12/139,640.

TECHNICAL FIELD

The technical field of the present application relates to a microcontroller with an integrated graphical processing unit.

BACKGROUND

Microcontrollers are widely used in consumer and industrial products to provide sophisticated user interaction and digital control at a small incremental cost. For example, rather than having a switch and a simple timer to control a coffee machine, a microcontroller with a small touchscreen liquid crystal display (LCD) could provide a superior user experience and allow for increased customization of the brew cycle, real-time status of the process and possible interaction with other household devices. A refrigerator might incorporate a microcontroller with an graphics display to track not only the performance of the refrigerator, but also the contents of the refrigerator. This would enable warnings of food expiration, automatic generation of a shopping list, and the automatic ordering of groceries from a delivery service. An industrial application might indicate the operational status of a backup power generator as well as a maintenance schedule combined with a log of performed maintenance and repair.

Where a graphical display is desired, a microcontroller is interfaced with the graphical display using a customized state machine specific to a type of display and possibly limited to particular geometries and color depths. The customized state machine must be redesigned if the characteristics of the display change. For example, the user requirements may change over time such that a monochrome display may be upgraded to a color one on new or existing machines. Alternatively, a different display technology may be substituted if the component pricing fluctuates significantly or where environmental conditions change. Prior to this invention, a change from a monochrome LCD to an active matrix thin-film transistor (TFT) display might require a redesign of the application specific integrated circuit (ASIC) in which the microcontroller and state machine are embedded. The other known approach is to use an off-chip LCD controller adding cost and complexity to the system.

Microcontrollers may also be employed with other parallel data sources or input/output devices to enrich the functionality of existing products and systems or to create new products and systems only possible with computer processing capabilities. Such peripherals include sensor arrays, network interfaces, and multi-point and pressure sensitive touch screens. A great number of possible input or output devices may be incorporated using a parallel data interface and one or more control signals. As with graphical displays, custom logic or external controllers have been required to interface a microcontroller with these input/output devices.

Many of the applications described herein are cost sensitive and would be cost prohibitive to implement with current technologies. At present, the implementation of a cost effective graphical display in an embedded environment requires custom application specific integrated circuitry (ASIC) and a high-volume production run over which the research, development and tooling expenses of that circuitry can be amortized. This approach is inflexible and prevents a manufacturer from responding to market dynamics in being able to shorten a product run or substitute an alternative display technology. Inflexibility of this nature adds to the risk of the project and can further drive up expenses.

SUMMARY OF THE INVENTION

According to an embodiment, a microcontroller may comprise a first central processing unit (CPU); a memory; a programmable cycle state machine; a special instruction processing unit (SIPU); a connection to an output device; wherein the SIPU manipulates multiple values in the memory responsive to a command from the CPU; wherein the programmable cycle state machine can continuously (there may be pauses if required by the external device) transfer data from the memory to the output device; and wherein the programmable cycle state machine can periodically transmit a control signal to the output device to coordinate the data transfers with the input timing requirements of the output device.

According to another embodiment, a microcontroller may comprise a central processing unit (CPU), a special instruction processing unit (SIPU), a programmable cycle state machine, and a direct memory access controller (DMA); wherein intensive processing of output data can be performed by the SIPU, thus freeing CPU cycles for other tasks.

According to yet another embodiment, a microcontroller may comprise a 16-bit central processing unit (CPU), a special instruction processing unit (SIPU), a programmable cycle state machine, and a direct memory access controller (DMA); wherein the microcontroller can display graphical information on a variety of sizes, color depths, and technologies of liquid crystal displays (LCD) and still has sufficient CPU bandwidth to respond in real-time to external interrupts.

BRIEF DESCRIPTION OF THE DRAWINGS

A more complete and thorough understanding of the present disclosure and advantages thereof may be acquired by referring to the following description taken in conjunction with the accompanying drawings, in which like reference numbers indicate like features. Preferred embodiments of the invention and its advantages are best understood by reference to FIGS. 1-17.

DETAILED DESCRIPTION

Figure 1:
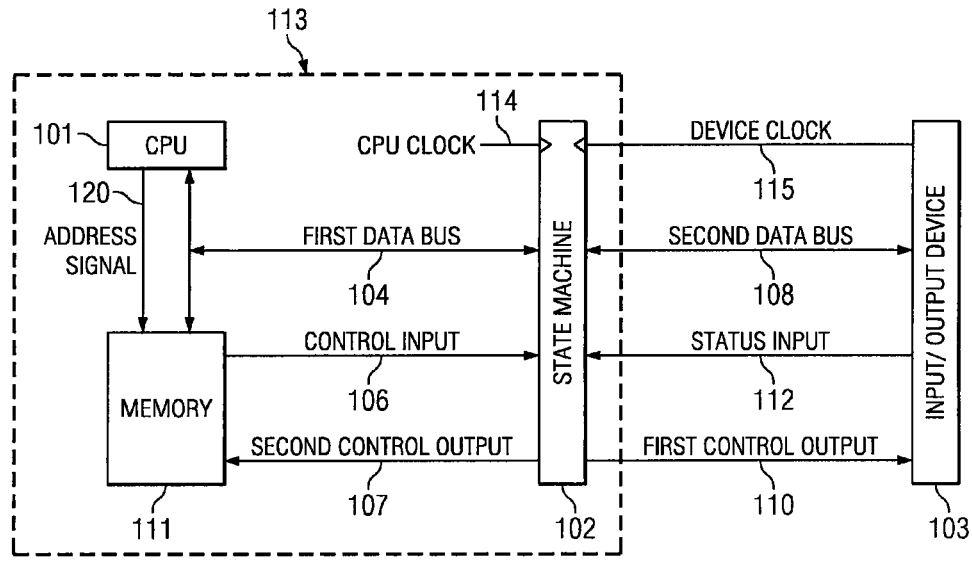
FIG. 1 is a block diagram showing the core components of one embodiment of the microcontroller and programmable cycle state machine interface connected to an input/output device.

In one embodiment of the present invention, a microcontroller is produced incorporating a programmable cycle state machine on the same chip with a central processing unit (CPU) and a memory. This microcontroller is suitable for direct connection to a wide variety of external display modules including most types of liquid crystal display (LCD) module having a parallel data interface. This LCD module typically includes counting and addressing logic to transmit the data from the parallel interface to the individual pixels. However, the LCD module need not incorporate any additional timing or addressing logic that would allow it to interface directly with a video memory such as direct memory access (DMA) logic. In this embodiment, software running on the microcontroller creates a digital representation of an image. This image may be a still image or a single frame of video. This may be by simply loading an existing image file into the memory or may be by creating an image using one of any number of well known techniques for building an image using software. If the application provides for user interaction, the image might include recognizable elements for data display, text or numerals and system control functions combined to create a graphical user interface (GUI). If the software needs to change one pixel, it need only change the data value representing that pixel in memory.

Operating independently from (and typically asynchronously with) the CPU, the programmable cycle state machine is performing a continuous loop that reads from the memory each value representing that image and transmits that value to the LCD module via the parallel interface. At certain points in that continuous loop, the programmable cycle state machine activates or deactivates one or more control signals as required by that specific type or model of LCD module. Because of the nature of many graphical display technologies, this loop continues even if the image data has not changed; the individual light blocking or light generating elements of the display maintain their current state for a small window of time and must be refreshed periodically.

In a further embodiment, the control input selects from a predetermined subset of common LCD display technologies in order to determine the necessary control output signal waveforms and timing specifications. The control input also specifies the physical geometry of the graphics display—the width and height in pixels—as well as the pixel depth supported by that graphics display in terms of levels of grayscale or the color depth of a color display. The first control output of the programmable cycle state machine in this embodiment must support signals indicating the boundary of a frame of pixel information, the boundary of a line of pixel information, the complete presentation of a unitary transfer of data across the bus, and a multipurpose signal. The multipurpose signal may be connected to dedicated control inputs, such as a shift control input LSHIFT2, a mode control input MOD, or a data ready control input DRDY or any other suitable control input. The second control output can support a data shift signal indicating that the state machine is ready for the next data transfer from the memory. In this embodiment, the state machine can comprises a frame counter, a line counter, and a data register. Finally, the state machine can comprise logic for maintaining the appropriate values of the counters, enabling or disabling the outputs, and generating the various control signals.

In another embodiment, the programmable cycle state machine is incorporated within the same integrated circuit as the microcontroller and graphics processing circuitry. In this embodiment, the microcontroller may include a 16-bit CPU capable of executing, e.g., fewer than 60 million instructions per second (MIPS), but still have the capability of displaying color graphics, images or video on an external display. That display may be at least as small as 64×64 pixels and at least as large as 852×480 pixels. Support for larger displays is possible as well. The pixel depth might typically range from one bit per pixel to twenty four bits per pixel, where twenty four bits per pixel represents eight bits of each of three primary colors. The primary colors may be red, green and blue, or may be represented in other forms. In particular, if a display technology uses subtractive color technology, the primary colors might be red, yellow and blue.

In another embodiment, a bistable (or multistable) display might be employed, which would eliminate the need for continuous refresh of pixel information. In this enablement, the programmable cycle state machine might poll the memory for changes or might be triggered by the CPU when a change is made. Once the change is detected or announced, the programmable cycle state machine would then output the entire block of image data to the display in the same general process as described above. Further optimizations are possible as well where the display allows for addressing of blocks of image data or even individual pixels. These optimizations would require logic and additional memory for detecting changes at a block level or even a pixel level. This change detection might be handled through the maintenance of a duplicate copy of the image data to allow for a comparison at any time between what should be displayed and what is currently displayed. Alternatively, various hashing algorithms could be employed to determine which part, if any, of the image data has been modified. In either embodiment, only the changed block or blocks or the changed pixel or pixels would be read and transmitted by the programmable cycle state machine in conjunction with appropriately timed control signals.

A person of ordinary skill in the art would understand that this programmable cycle state machine would be useful with other output devices. For example, an audio codec requires a steady stream of digital audio data read from a memory and could be controlled with a programmable cycle state machine. Any output device with a parallel data interface that requires streaming of digital data with coordinated timing or control signals could be connected to the programmable cycle state machine in this embodiment without custom logic, or with minimal off-chip custom logic.

In another embodiment, the programmable cycle state machine may comprise additional control logic to allow input from an external data source. This data source could be an analog to digital converter for audio or other signal capture purposes or could be an array of sensors such as an image capture device. In this embodiment, the programmable cycle state machine might accept a trigger signal from the CPU or the external input device and would begin one or more read cycles from that the external input device. As in the case of the embodiment driving a standard graphics display, this embodiment might be configured to continuously read the captured data without regard to changes in the data or it might be configured to operate on an as-needed basis triggered by a data change.

The specific descriptions herein should not be considered limiting as one of ordinary skill in the art would understand the need to make specific design trade-offs based on a particular application or marketing plan. The data path described herein is typically a parallel data path and may be a bus or a direct connection, but one of ordinary skill in the art would recognize that the data path can be implemented using a serial connection or a serial bus. Furthermore, the state machine could convert a serial data source to a parallel one or convert a parallel data source to a serial one. The data passed via the data input to the data output may be digital audio and/or graphical data. The second control output indicates to a data source that the state machine is ready for additional data. The data source may be a register, a direct memory access (DMA) device, or a first in first out (FIFO) memory. The specific implementation of the data source is not of significance to this embodiment and one of ordinary skill in the art would understand that substitutions are appropriate here. The control input may be provided by a register, read only memory (ROM), flash memory, mechanical switches such as dual-inline-pin (DIP) switches, or any other source.

In a further embodiment, the CPU is paired with a dedicated graphics processing unit (GPU) capable of implementing graphics specific routines that would require significant processing power if implemented in software on the general purpose CPU. This embodiment would allow a modest CPU, say a 16-bit, low MIPS design, to produce graphics on an external display while still having spare processing capacity to handle other application logic. The GPU of this embodiment might perform bit blitting operations or hardware sprite drawing allowing the processor to send high-level raster operations to combine bitmap patterns or render simple computer graphics. Alternatively, the GPU could implement more sophisticated routines implementing macros to draw graphical user interface elements including lines, windows and menus as well as handle image or video decoding functions. In this embodiment, the CPU sends a command to the GPU to make a change to the display output. This command would be implemented by the GPU to modify the video data in the memory. In a typical embodiment, the programmable cycle state machine is asynchronously and continuously reading this video data from the memory to output to the video display. Any visual "artifacts" resulting from displaying the video data before the modifications have been completed will be overwritten by a subsequent refresh of the video data by the programmable cycle state machine.

In a further embodiment, the CPU is paired with a digital signal processing (DSP) unit that can implement floating point arithmetic and array operations. In this embodiment, the CPU can offload specialized and intensive data processing requests to the DSP so that the CPU utilitization remains low enough to be responsive to user requests and real-time tasks.

In another embodiment, the CPU is paired with a special instruction processing unit (SIPU) and further comprises a programmable cycle state machine, a memory, and a direct memory access device (DMA). In this embodiment, the general purpose CPU may dedicate its processing bandwidth to general operations, flow control and responding to real-time interrupts. Repetitive or complex tasks are offloaded to the SIPU such that the inexpensive combination of a low MIPS CPU and a SIPU is capable of generating full color graphics or decoding audio or video data in real-time. This SIPU preferably handles a limited instruction set that may be specific to one or more applications, e.g. graphics processing or real-time decoding of video data or audio data. When paired with a DMA device, the SIPU issues DMA instructions to fetch and store blocks of data from memory as part of its processing tasks. Otherwise, the SIPU must include logic to directly cycle through contiguous blocks of data storage as part of its processing tasks.

The instruction set for the SIPU preferably includes the three primary logical operations of AND, OR, and XOR where the first operand is a current value from the portion of memory that represents the current state of the graphics output. (This portion of memory may be called the video buffer and is also the source of the data periodically output by the programmable cycle state machine.) Alternatively, the first operand might be a memory location other than the video buffer allowing for "off line" manipulation of graphical data. This "off line" buffer could then be displayed using a picture-in-picture operation or by redirecting the PCSM to read from this parallel video buffer if appropriate. The second operand may be a constant specified by the CPU, a local variable subject to manipulation by the SIPU, or a data value from memory. These operations allow the SIPU to perform any number of common bit blitting operations. The instruction set for the SIPU may also include instructions for drawing common geometric shapes such as points, lines, rectangles, circles, ovals, rounded rectangles or any other shape that might commonly be used to draw elements of a graphical user interface. The instruction set for the SIPU may include a background fill operation as well, which would replicate a specified one or two dimensional pattern across the entire video buffer. The SIPU preferably includes a block transfer instruction that allows the transfer of multiple data words from one portion of memory to another or from one memory to another. Finally, the SIPU instruction set may include a picture in picture operation that copies data from one portion of memory into a specific portion of the video buffer. The picture in picture operation may be executed once or continuously. Additionally, this operation may be required to resize or crop the source image to fit into the target portion of the video memory. The arguments for the picture in picture operation must include the specification of an origin row and column as well as length and width of the target area.

In another embodiment, the SIPU may operate on more than one data structure, each representing one aspect of the currently displayed graphics. One data structure might represent a background image, while another might represent an arrangement of user interaction elements such as virtual buttons, virtual lights, alpha/numeric symbols, etc. The SIPU would then combine the data structures using logical AND, OR, and XOR operations to form a composite image in the video buffer portion of the memory.

Turning to the drawings, exemplary embodiments of the present application will now be described. FIG. 1 depicts components of one embodiment of the microcontroller 113 and programmable cycle state machine interface 102 connected to an input/output device 103. CPU 101 is shown connected to memory 111 and first data bus 104, however one of ordinary skill in the art would appreciate that the specific interconnection of these components could be varied without impacting function or utility of this embodiment. Moreover, appropriate select signals or addressing signals 120 can be provided. Likewise, one of ordinary skill in the art would understand how to add additional CPU 101 or memory 111 components to further the goals of the invention by increasing performance characteristics of the microcontroller. First data bus 104 is shown connected to the programmable cycle state machine 102, the memory 111 and the CPU 101. A direct connection to a memory 111 or a direct memory access (DMA) device is also contemplated. Memory 111 might be a register, a FIFO memory device, or any other common memory type. In the figure, memory 111 provides the values for control input 106, but other arrangements for providing some or all of the values to control input 106 are contemplated including, but not limited to, physical switches, or a programmable read only memory (PROM). For the purpose of providing a value on control input 106, a single layer memory such as a register may be preferable.

Second control output 107 is shown connecting state machine 102 to memory 111 in a configuration allowing sequential reads from or writes to that memory. One of ordinary skill in the art would appreciate the possibility of connecting 107 second control output to an interrupt port on CPU 101 where input is retrieved from input/output device 103 and status input 112 indicates the status of input/output device 103 with one or more status or timing signals. CPU clock 114 is shown as an input to state machine 102, however one of ordinary skill in the art would recognize that this clock signal will be available to any microcontroller component. Device clock 115 allows the programmable cycle state machine to generate signals synchronized with the device timing domain. Second data bus 108 provides a data path between state machine 102 and input/output device 103. This data path is likely a bus and likely a parallel bus, but it could be a direct connection and could be a serial data path. First control output 110 provides a control signal to input/output device 103 and many applications will provide a number of control signals providing control and/or timing information.

While FIG. 1 shows the input/output device 103 as being external to the microcontroller 113, one of ordinary skill in the art would understand that the input/output device could be incorporated into the same integrated circuit. For example, an image capture sensor could be incorporated into the same integrated circuit as the microcontroller to reduce cost and application size and power requirements. Furthermore, one of ordinary skill in the art would recognize the value of incorporating more than one programmable cycle state machine 102 into the microcontroller where more than one input/output device 103 are to be connected.

The following figures and description relate to an application of the programmable cycle state machine used to interface a microcontroller with a variety of display types. In one application, the programmable cycle state machine is meant to interface with the parallel data interface of an LCD module. The digital input to LCD module accepts data in the form of 'frames,' where one frame is defined as one full screen of display information. Within each frame is a series of 'lines,' one for each row. Within each line are multiple data transfers as the width of the LCD display is substantially wider than the data path into the LCD module. The frame, line and shift periods are, therefore, used as the basis of the state machine design in this embodiment. This allows for the construction of a state machine that covers the superset of the required timing for all the supported LCD types. When a specific LCD type is to be interfaced, all that changes in the state machine behavior is polarity and timing of the outputs. These changes and the relative time placements and duration of each signal may be software configurable or externally configurable.

Figure 2:
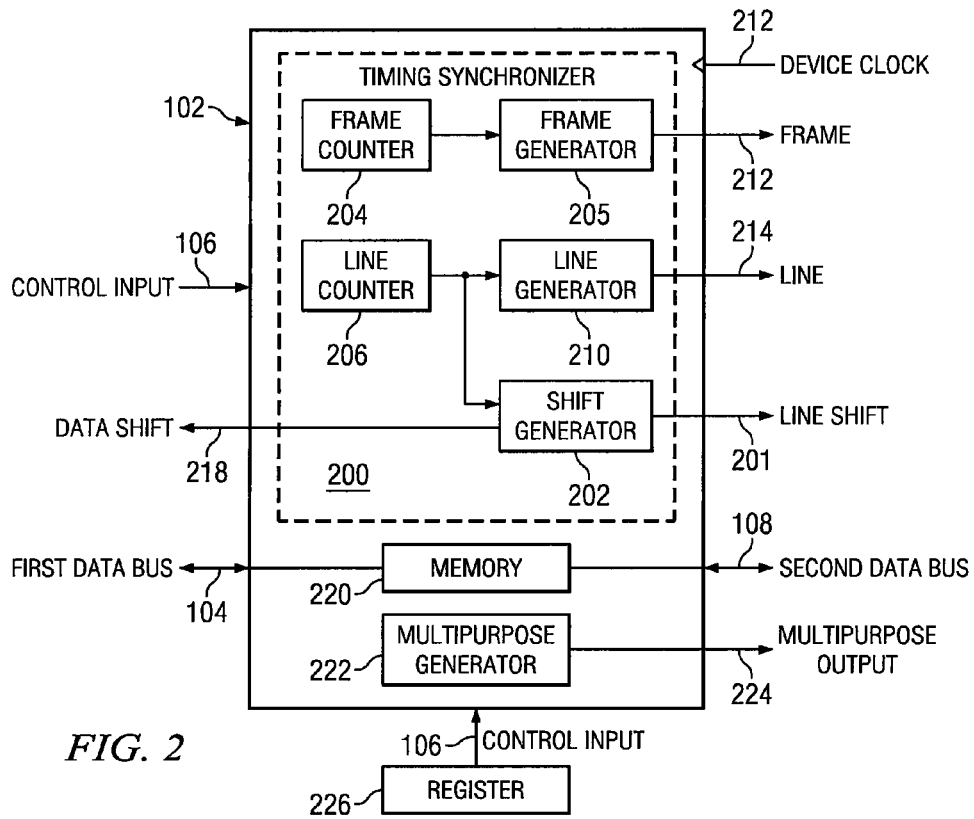
FIG. 2 is a block diagram showing the internal components of one embodiment of the programmable cycle state machine.

FIG. 2 depicts one embodiment of a programmable cycle state machine 102 enabled to drive a video display device. Frame counter 204 counts data values transferred and resets when a full frame of video data has been transferred. Frame generator 205 generates a signal on the frame 212 output based on the value of frame counter 204 and that of control input 106. Line counter 206 counts data values transferred and resets when a full line of video data has been transferred. Line generator 210 generates a signal on line 214 based on the value of line counter 206 and control input 106. Shift generator 202 generates a signal on line shift 201 based on the value of line counter 206 and control input 106. Shift generator 202 also generates a signal on data shift 218 based on the value of line counter 206 and control input 106, this signal being used to request data on first data bus 104. First data bus 104 provides a source of graphics data stored in memory 220 and forwarded to second data bus 108. Multipurpose generator 222 generates a signal on the multipurpose output 224, which can be used to generate a DRDY, MOD, or DSHIFT2 input required by various LCD types. Register 226 stores the program for the programmable cycle state machine and provides control input 106. Timing synchronizer 200 is a subset of the component parts of the programmable cycle state machine. Device clock 115 controls most of the timing of programmable cycle state machine 102.

Figure 3:
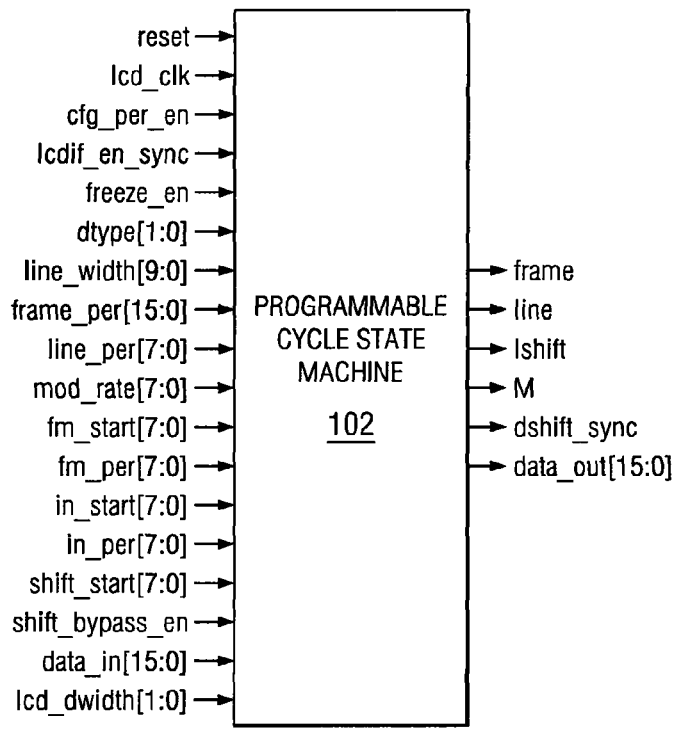
FIG. 3 is a block diagram showing the input and output signals of one embodiment of the programmable cycle state machine.

FIG. 3 depicts an embodiment of programmable cycle state machine 102 enabled to interface with an LCD display driver. Each input and output is described the following table. While some of the inputs and outputs in this figure and table have fixed data widths and hard-coded values, the data widths and hard-coded values could be adjusted to meet different application requirements.

TABLE

Input/Output Descriptions

| Input/Output Name | Description |
|---|---|
| reset | State machine reset |
| lcd_clk | Clock input in the LCD timing domain |
| cfg_per_en | State machine enable |
| lcdif_en_sync | Start LCD timing engine and associated counters |
| freeze_en | Debug mode |
| dtype[1:0] | Display type: |
| | 00 = Monochrome |
| | 01 = STN Format 1 |
| | 10 = STN Format 2 |
| | 11 = TFT |

TABLE-continued

Input/Output Descriptions

| Input/Output Name | Description |
|---|---|
| line_width[9:0] | Number of columns in the glass |
| frame_per[15:0] | Number of lcd_clk cycles in one frame |
| line_per[7:0] | Number of lcd_clk cycles in one line |
| mod_rate[7:0] | Toggle frequency |
| fm_start[7:0] | Frame counter value at which to make frame output active |
| fm_per[7:0] | Frame counter value at which to make frame output inactive |
| ln_start[7:0] | Line counter value at which to make line output active |
| ln_per[7:0] | Line counter value at which to make line output inactive |
| shift_start[7:0] | Line counter value at which to start clocking out valid data on data_out[15:0] |
| shift_bypass_en | Output lcd_clk on the lshift output whenever lcdif_en = 0 |
| data_in[15:0] | LCD data input |
| lcd_dwidth[1:0] | LCD glass data width indicator:<br>00 = 1 to 4 bits wide<br>01 = 5 to 8 bits wide<br>1X = 9 to 16 bits wide |
| frame | LCD frame sync output |
| line | LCD line sync output |
| lshift | LCD line shift clock |
| M | LSHIFT2 when dtype[1:0] = 01<br>DRDY when dtype[1:0] = 11<br>MOD when dtype[1:0] = 10 or 00 |
| dshift_sync | Input data accepted |
| data_out[15:0] | LCD data output |

The module functions in the lcd_clk domain, which is the clock controlling signals flowing through to the LCD display. In this embodiment, all inputs to the module are in the CPU clock domain. In order to minimize synchronization logic, it is required that all inputs be stable before the lcdif_en_sync signal is taken high. The signal lcdif_en_sync passes through synchronizers and can be changed at any time.

A data source not shown in FIG. 3 provides the data to the state machine. The data source can be a DMA, a FIFO, a register, or any combination of these. The exact implementation of this data source is not important for the purposes of this embodiment. Data is provided through the data_in[15:0] input. The dshift_sync output signals to the data source that the current data word has been shifted in, and the next word can be presented. The lcd_dwidth[1:0] input indicates the width of the data bus input to the LCD module: '00' indicates 4-bits, '01' indicates 8-bits, '11' indicates 16-bits. If the width of the parallel data bus input to the LCD module is not exactly 4, 8 or 16 bits, the lcd_dwidth[1:0] should be set to the next highest value. For example, a 12-bit input will have the data width set to '11' (16-bits) and the four most significant bits will not be used.

Typically, a register interface provides all of the control inputs to the state machine. This register is preferably connected to the CPU to allow changes to the control inputs using a software instruction. However, other configurations are contemplated. In some applications, the values may be set directly or indirectly through the use of physical switches such as dual inline pin switches or rotary switches. In other applications, the values may be set directly or indirectly through the use of a nonvolatile memory such as EPROM, EEPROM, or flash memory.

Various display technologies may be interfaced with a programmable cycle state machine. A subset of available display technologies are described below in detail, but this subset should not be seen as limiting. Other technologies relevant to this invention include, but are not limited to: zero-power bistable display, plasma display, liquid crystal on silicon device, digital micromirror device, light-emitting diode panel, and organic light-emitting diode (OLED) display. The very nature of the invention lends itself to adaptation to new display technologies or existing technologies not previously of interest or available to applications engineers and marketers.

Figure 13:
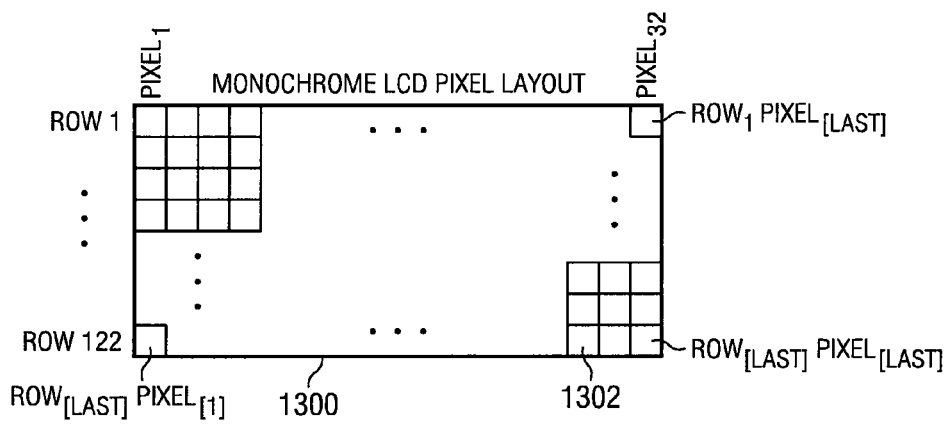
FIG. 13 is a depiction of a typical monochrome liquid crystal display panel indicating the layout of pixels.

Monochrome LCD displays typically have either a 4-bit or 8-bit interface. Since no color information is needed, each data bit represents the state of one pixel. FIG. 13 shows the pixel layout of a 122 by 32 monochrome LCD display with panel 1300 and pixels 1302. The data is input n bits at a time (where n is the data bus width of the panel), with an lshift pulse signaling each valid data transfer. The scan pattern usually starts at the upper left of the glass at pixel$_1$ in row$_1$ and proceeds to the right till it reaches pixel$_{[last]}$ in row$_1$, then starts with pixel in row$_2$, and so on. A pulse on the line output signals the beginning of a new row. Before the end of each row, most displays will require a 'horizontal non-display period.' A pulse on the frame output signals the end of a full display frame and a reset to row$_1$. Before the end of each frame, most displays will require a 'vertical non-display period.' These non-display periods may be built into the pulse widths of the line and frame signals.

While specific display geometries are referenced in various embodiments, these are not intended to be limiting. Graphical displays, including various LCD technologies, are available in a wide range of geometries. For low-cost, embedded applications, displays smaller than VGA (640 by 480 pixels) or even QVGA (320 by 240 pixels) are of primary interest. These modules might be as small as 122 by 32 pixels. Depending on the application, however, one or more embodiments described herein might be used to drive LCD modules with geometries like WVGA (854 by 480 pixels) or larger. In one embodiment, the programmable cycle state machine supports monochrome, STN and TFT display technologies, a variable aspect ratio, resolutions up to VGA (640 by 480 pixels), up to 1024 lcd_clk pulses per line, up to 65,536 lcd_clk pulses per frame, and data widths up to 24-bits.

Figure 12:
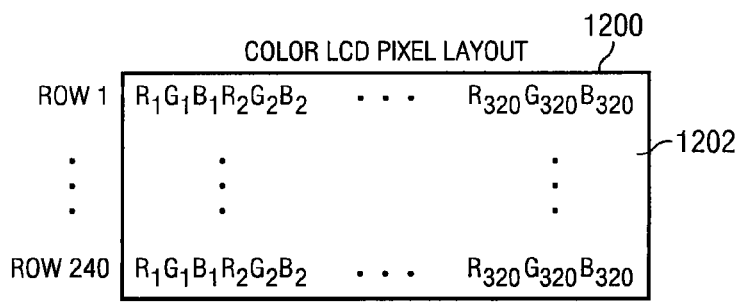
FIG. 12 is a depiction of a typical color liquid crystal display panel indicating the layout of pixels.

Super twisted nematic (STN) displays typically have a 4-, 8- or 16-bit interface. Each color point on the screen is composed of three separate pixels placed side-by-side: one red, one green and one blue. For example, a color QVGA (320× 240 pixels) panel is depicted in FIG. 12 with panel 1200 and pixels 1202. Thus, a panel of 320×240 pixels can be visualized as a panel with 960×240 pixels, with each pixel being one color. The data is output to the panel n bits at a time (where n=data bus width of the panel), with an lshift pulse signaling each valid data transfer. Each bit in the data represents the 'on' or 'off' value of one of the colors.

The scan pattern usually starts at the upper left of the glass at pixel$_1$ in row$_1$ and proceeds to the right till it reaches pixel$_{[last]}$ in row$_1$, then starts with pixel$_1$ in row$_2$, and so on. A pulse on the line output signals the beginning of a new row. Before the end of each row, most displays will require a Horizontal Non-display Period. A pulse on the frame output signals the end of a full display frame and a reset to row$_1$. Before the end of each frame, most displays will require a Vertical Non-display Period. For example, suppose the glass has colors arranged $R_1G_1B_1R_2G_2B_2\ldots$, etc. A fully red pixel, followed by a fully white pixel, would show on an 8-bit data bus as 100111xx. The last two bits, represented by xx, would be pixels $R_3B_3$, and so on.

There are three common variants of the STN interface. Format 1 is a variant of the STN interface that uses a second clock called LSHIFT2, which is 180° out of phase with the lshift clock. When the programmable cycle state machine is put into STN Format 1, the M output becomes the LSHIFT2 clock. Format 2 is a variant of the STN interface that uses a signal called MOD (on the LCD module) connected to the M output of the state machine. The timing of this signal depends on the LCD module, and may toggle once or more for every toggle of the frame output, depending on the mod_rate[7:0] input. Finally, Dual Scan STN displays have a wider data bus interface that allows the upper and lower halves of the display to be updated at the same time (e.g., a display with 240 rows and an 8-bit interface will have data_out[7:0] transmitting $R_1G_1B_1R_2R_{121}G_{121}B_{121}R_{122}$). The state machine need not have a special setting to support dual scan displays as these displays can be treated as STN displays with twice the data width and half the number of rows. The values presented to data_in[7:0] by the memory will simply have to be reordered accordingly. DSTN displays usually have a Format 2 data interface.

Thin-Film Transistor (TFT) panels offer the best color and contrast quality of the three technologies. This technology has one transistor fabricated on the glass for each pixel. The data interface has separate bits for each color. For example, a 24-bit color TFT will have an 8-bit input for each of the red, green and blue colors. Therefore, data is input to the display as 24-bits, or one pixel, at a time. A pulse on the lshift input while the M output is high signals a valid data transfer. The scan pattern usually starts at the upper left of the glass at $pixel_1$ in $row_1$ and proceeds to the right till it reaches $pixel_{[last]}$ in $row_1$, then starts with $pixel_1$ in $row_2$, and so on. A pulse on the line output signals the beginning of a new row. Before the end of each row, most displays will require a Horizontal Non-display Period. A pulse on the frame output signals the end of a full display frame and a reset to $row_1$. Before the end of each frame, most displays will require a Vertical Non-display Period. The M output of the state machine is connected to an input to the display called DRDY. This signal goes high showing that the output data is valid (i.e., the state machine is not currently in a Vertical or a Horizontal Non-display Period).

More generally, the operational characteristics are as follows. The state machine is enabled when lcdif_en=1. When lcdif_en=0, all outputs are taken low. The timing synchronizer module 200 is the master time keeper of the state machine. The module consists of two counters. One is the frame counter 204 that counts from zero up to frame_per[15:0]. The second is the line counter 206 that counts from zero up to line_per[7:0]. Both counters start counting at the same edge of lcd_clk. The line counter 206 always resets to zero when the frame counter 204 resets to zero. All of the other outputs from the programmable cycle state machine use these counters to count timing for their outputs.

All inputs to the module are in the CPU clock domain. However, lcdif_en_sync and data_in[15:0] are the only two inputs that change when the state machine is active. The first of these inputs, lcdif_en_sync, passes through synchronizers into the lcd_clk domain, to yield the signal lcdif_en (not shown). The second of these inputs, data_in[15:0], does not need to be synchronized for the following reasons:

When the first data_in[15:0] is clocked in (see FIG. 5), the data_in[15:0] is expected to be stable for several lcd_clk periods.

Thereafter, the data_in[15:0] will not change until the dshift_sync output goes high. The dshift_sync is generated from the signal dshift, which in turn is generated by the lcd_clk, thereby providing the required synchronization.

All other inputs are required to be stable, when lcdif_en_sync goes high. The only output from this module that goes back into the CPU clock domain is dshift_sync. This signal is synchronized inside the Data Synchronizer block 400 (described below).

Figure 4:
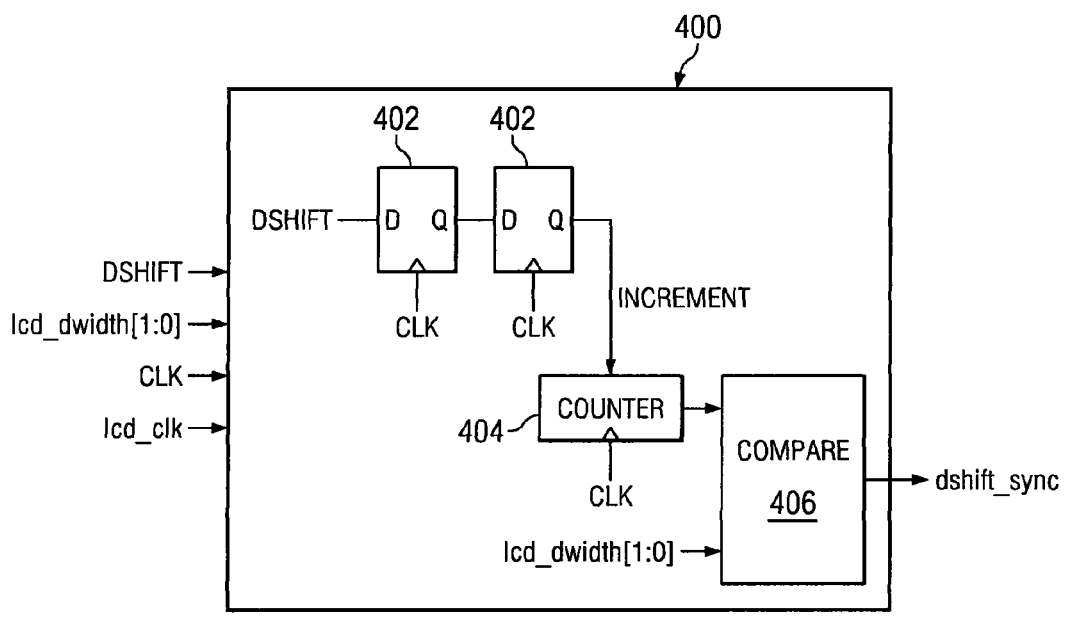
FIG. 4 a block diagram showing circuitry required in one embodiment for transforming the data shift signal from the display clock domain to the CPU clock domain.

FIG. 4 depicts one embodiment of a Data Synchronizer block 400, a circuit designed to synchronize dshift into the CPU timing domain and account for varying input data widths of LCD panels. The synchronizer comprises two D flip flops 402, a counter 404 and a comparator 406. The resulting signal is dshift_sync. The data synchronizer synchronizes the internal dshift signal, which is in the lcd_clk domain, into dshift_sync output signal which is in the CPU clock domain. Also, the dshift_sync signal comprehends the data width of the glass to the input. It generates:

one pulse for every 4 dshift pulse when lcd_dwidth [1:0]='00';

one pulse for every 2 dshift pulse when lcd_dwidth [1:0]='01';

one pulse for every dshift pulse in all other cases.

Figure 5:
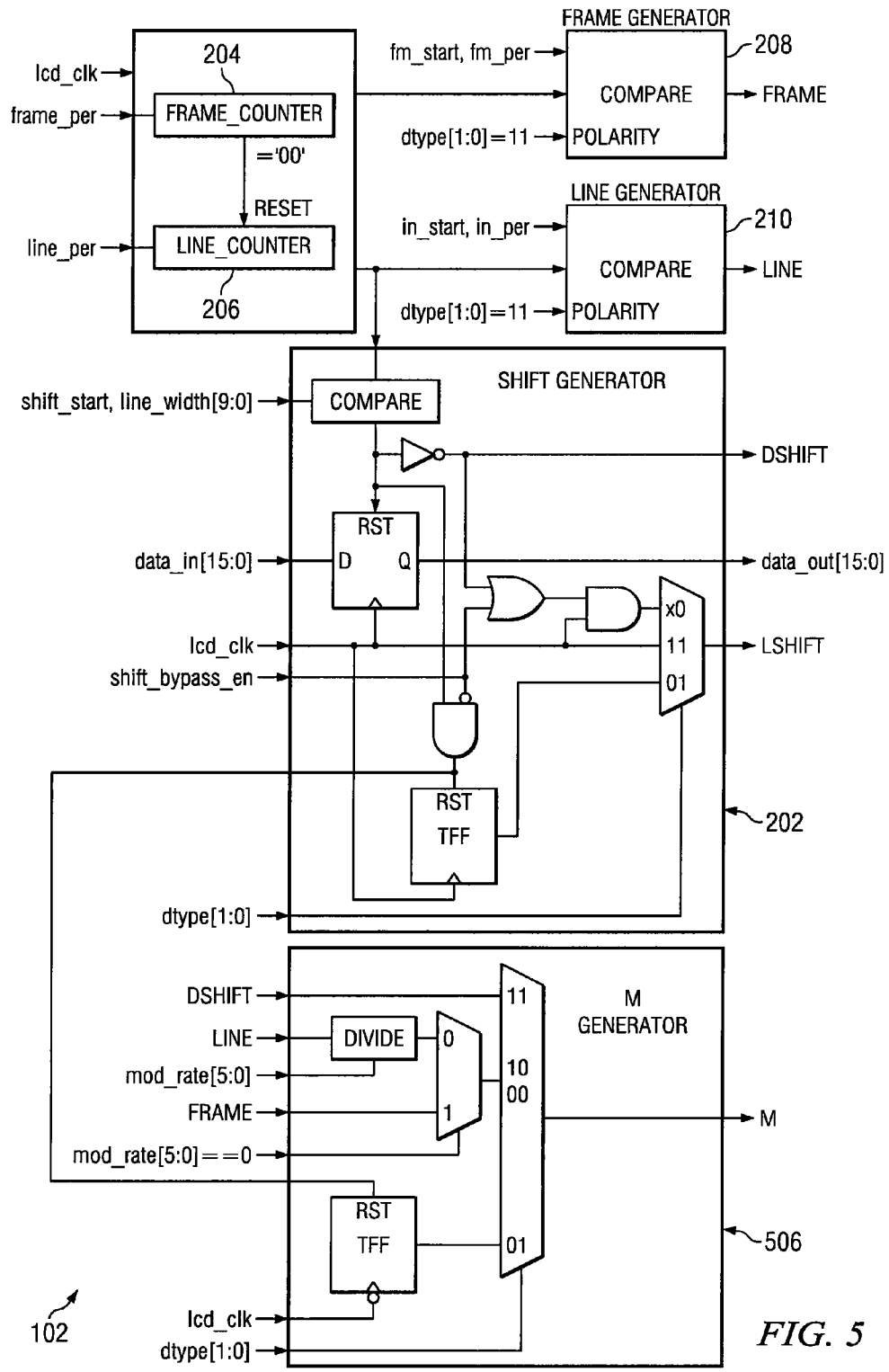
FIG. 5 is a block diagram showing the internal components of one embodiment of the programmable cycle state machine.

FIG. 5 depicts a further embodiment of a programmable cycle state machine 102 including some of the detailed logic and circuitry discussed above. The frame generator 208 generates the frame output. It comprises a comparator that compares the frame_counter 204 to the fm_start input. When the two are equal, the frame output is activated for fm_per number of clock cycles. When dtype[1:0]='11', low is considered active. Otherwise, high is considered active. The line generator 210 generates the line output. This comprises a comparator that compares the line_counter 206 to the ln_start[7:0] input. When the two are equal, the line output is taken active for ln_per[7:0] number of clock cycles. When dtype[1:0]='11', low is considered active. Otherwise, high is considered active.

The shift generator 202 generates the lshift, dshift and data_out[15:0] outputs. It comprises a comparator that compares the line counter 206 to shift_start[7:0]. When the line counter 206 reaches the value shift_start[7:0], the input data_in[15:0] is clocked into a memory on the rising edge of lcd_clk. The data_out[15:0] port is connected directly to the output of this memory. Simultaneously, the dshift output is taken high for one lcd_clk cycle. This process is repeated for line_width[9:0] number of times, to shift out the data in the entire row. When the entire row is shifted out, data_out[15:0] is taken low. The lshift output works differently depending on whether you are connected to a TFT interface or not. This is set using the dtype[1:0] input. When dtype[1:0]='11', the interface is assumed to be connected to a TFT interface. In TFT mode, the lshift output is a direct output of lcd_clk. Otherwise, the interface is assumed to be connected to a non-TFT panel. In TFT mode, the lshift output is a direct output of the lcd_clk when valid data_out[15:0] is being shifted out. During the period when the value of line_counter is less than shift_start[7:0], the lshift output is low. Also, when the last data word has been shifted out, the lshift output is low. If a non-TFT panel that requires a continuous lshift output is present, then the shift_bypass_en input can be taken high. This will output the lcd_clk directly to the lshift output.

M generator 506 depicts logic designed to generate the multipurpose signal M. This depiction is only one possible implementation and should not be seen as limiting in function or implementation. The M output of the timing interface works as set by the dtype[1:0] and the mod_rate input. When dtype[1:0]='11', the mod_rate input is ignored. In this mode, the M output functions as a data ready output (DRDY). The M output goes high when line counter 206 reaches the value shift_start[7:0]. It stays until the last data_out[15:0] word is shifted out. When dtype[1:0]='11', the mod_rate[7:0] input determines the toggle rate of the M output. When mod_rate

[7:0] is zero, the M output toggles at the same time as the frame output. When mod_rate is greater than zero, it represents the number of line output toggles between toggles of the M output.

A further embodiment of the invention is best explained through timing diagrams (FIGS. 6 through 10) indicating the input and output signals under certain conditions. Because the device is expected to interface to a broad spectrum of LCDs from diverse manufacturers, the output signal timing has to be subject to modification. The timing engine allows the output control signals to be adjusted to go high and low at any positive clock edge within the frame by using two inputs for each signal, the xx_start and xx_per inputs. There are also two counters, called the frame_counter and the line_counter.

The frame_counter determines how many lcd_clks are in one frame. It counts up to the value frame_per[15:0], resets to zero, and then repeats. These counters start on the first lcd_clk edge when lcdif_en is sampled high.

The line_counter determines how many lcd_clks there are in one line (row) of the LCD module. This count is the sum of the Horizontal Display Period and the Horizontal Non-display Period. It counts up to the value line_per, resets to zero, and then repeats. The line_counter will also reset at the same instant the frame_counter resets. Note that the number of lcd_clks in the Horizontal Display Period does not necessarily equal the number of pixels in one row of the display. For TFT displays, one lcd_clk usually corresponds to one pixel. But for other display technologies, it varies depending on bus width and color depth. The user can thus program the length of a frame and line.

The last input needed to set up the frame is the line_width [9:0] input. This input determines how many outputs on the data_out[15:0] bus it takes to complete one row. It is assumed each data_out[15:0] output takes one lcd_clk period. Thus, this input (when multiplied by the lcd_clk period) gives the total time in the Horizontal Display Period.

For FIGS. 6 through 10, the following settings are assumed:
  frame_per[15:0]=644: Specifies 644 lcd_clk cycles in each frame. Note that this does not represent an actual value based on a standard display geometry. Rather, it is intended to show the general manner in which this machine can function.
  line_per=244: Specifies 244 lcd_clk cycles in each line
  fm_start=4: Specifies that the frame output should go high when the frame_counter reaches the value '4'.
  fm_per=6: Specifies that the frame output should go low when the frame_counter reaches the value '6'.
  ln_start=1: Specifies that the line output should go high when the line_counter reaches the value '1'.
  ln_per=4: Specifies that the line output should go low when the line_counter reaches the value '4'.
  shift_start=4: Specifies that memory 220 should latch in a new value from data_in[15:0] when the frame counter reaches the value '4'. The output of memory 220 directly connects to data_out[15:0].
  line_width='n': Specifies that once shift_start is reached, continue clocking in one value every lcd_clk until the line_counter reaches the value 'n'.
  Note that all the input settings should be set up before the lcdif_en input is taken high.

Figure 6:
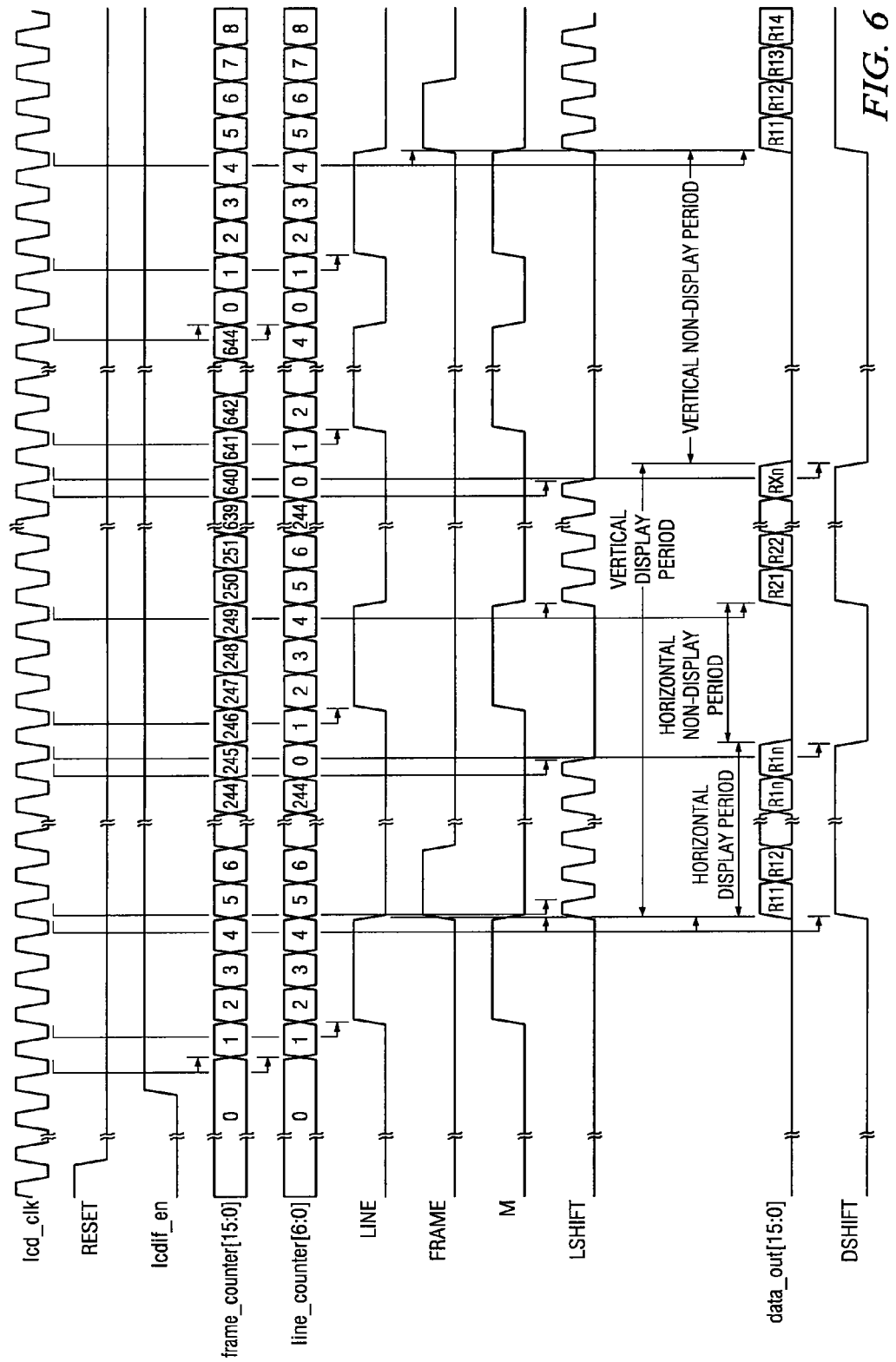
FIG. 6 is a timing diagram showing the output signals of the programmable cycle state machine in an embodiment programmed to drive a monochrome or a format 2 super twisted nematic (STN) display with the shift bypass option disabled.

FIG. 6 depicts the signal timing, as programmed, for a monochrome or STN format 2 display where shift_bypass_en=0. In this embodiment, shift_bypass_en=0 and the input mod_rate=1, which means that the M output toggles at the same rate as the line output. The timing diagram presents slightly more than one frame worth of data transferred, as indicated by the two pulses of the frame signal. The outputs of the programmable cycle state machine are synchronous with the lcd_clk. The two counters begin counting after the reset input has fallen and after the lcdif_en is set to 1, which indicates that the inputs are stable. Line_counter counts from 0 to 244 in this example, the sum of the number of pixels in each line (240 pixels) and the length of the required horizontal non-display period (4 clock cycles). Frame_counter counts from 0 to 644 in this example. Once frame_counter reaches the total frame count, both frame_counter and line_counter reset and the process repeats. The line signal is taken high for three clock cycles based on the line_start and line_per values, which are 1 and 4 respectively, starting on the clock cycle following that in which line_counter equals line_start and ending during the clock cycle in which line_counter equals line_per. Likewise, the frame signal is taken high for two clock signals based on the fm_start and fm_per values, which are 4 and 6 respectively. The M output is substantially the same as the line output in this embodiment. The lshift output is substantially the same as the lcd_clk input, but only during the horizontal display periods. The data_out output represents valid data during the horizontal display periods and is zero or inactive during the non-display periods. The dshift output is taken high only during the horizontal display periods.

Figure 7:
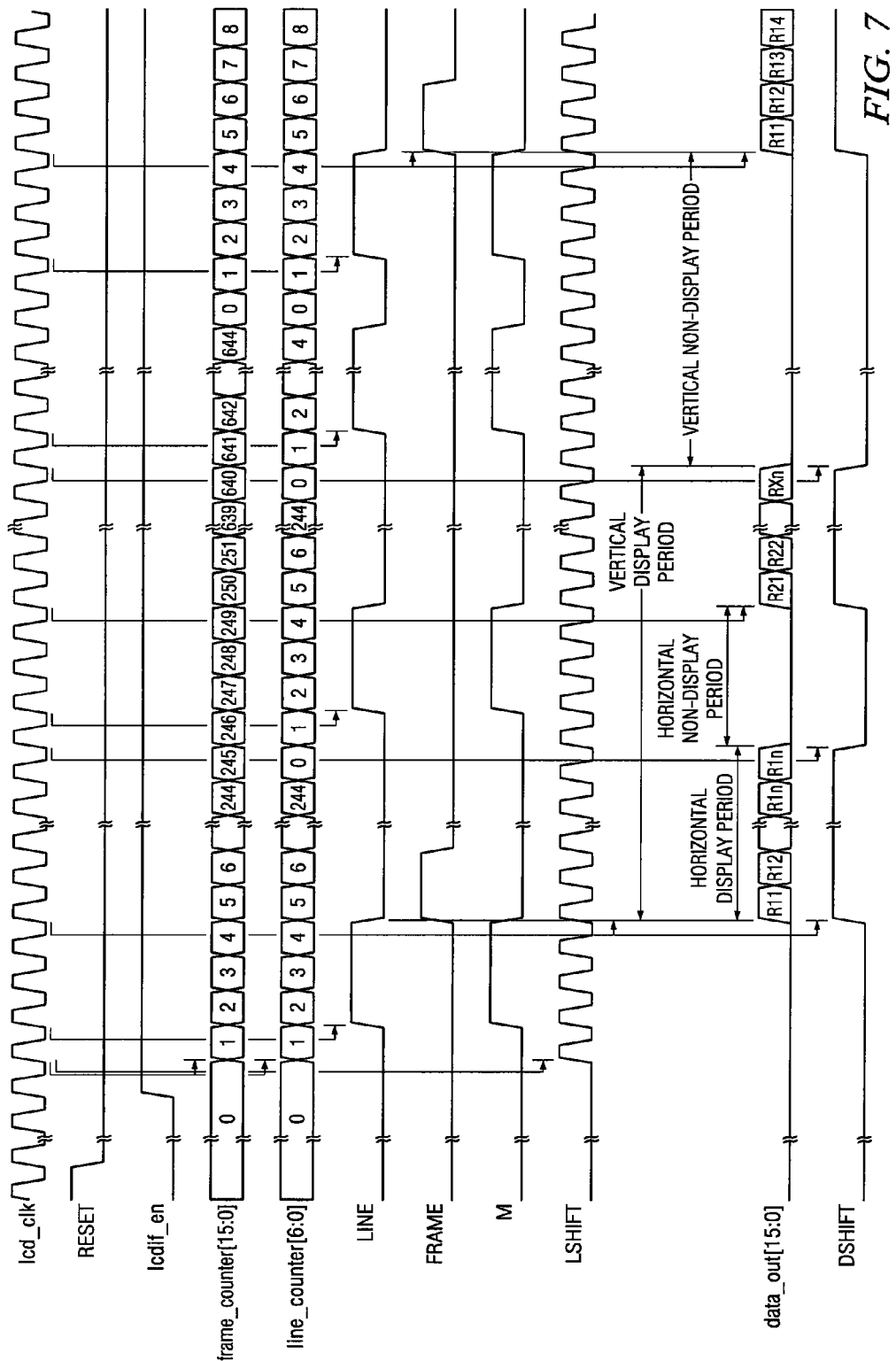
FIG. 7 is a timing diagram showing the output signals of the programmable cycle state machine in an embodiment programmed to drive a monochrome or a format 2 STN display with the shift bypass option enabled.

FIG. 7 depicts the signal timing, as programmed, for a monochrome or STN format 2 display where shift_bypass_en=1. The outputs are identical to FIG. 6 with one exception. Because shift_bypass_en=1, the lshift signal is a pass through of the lcd_clk input when lcdif_en=1.

Figure 8:
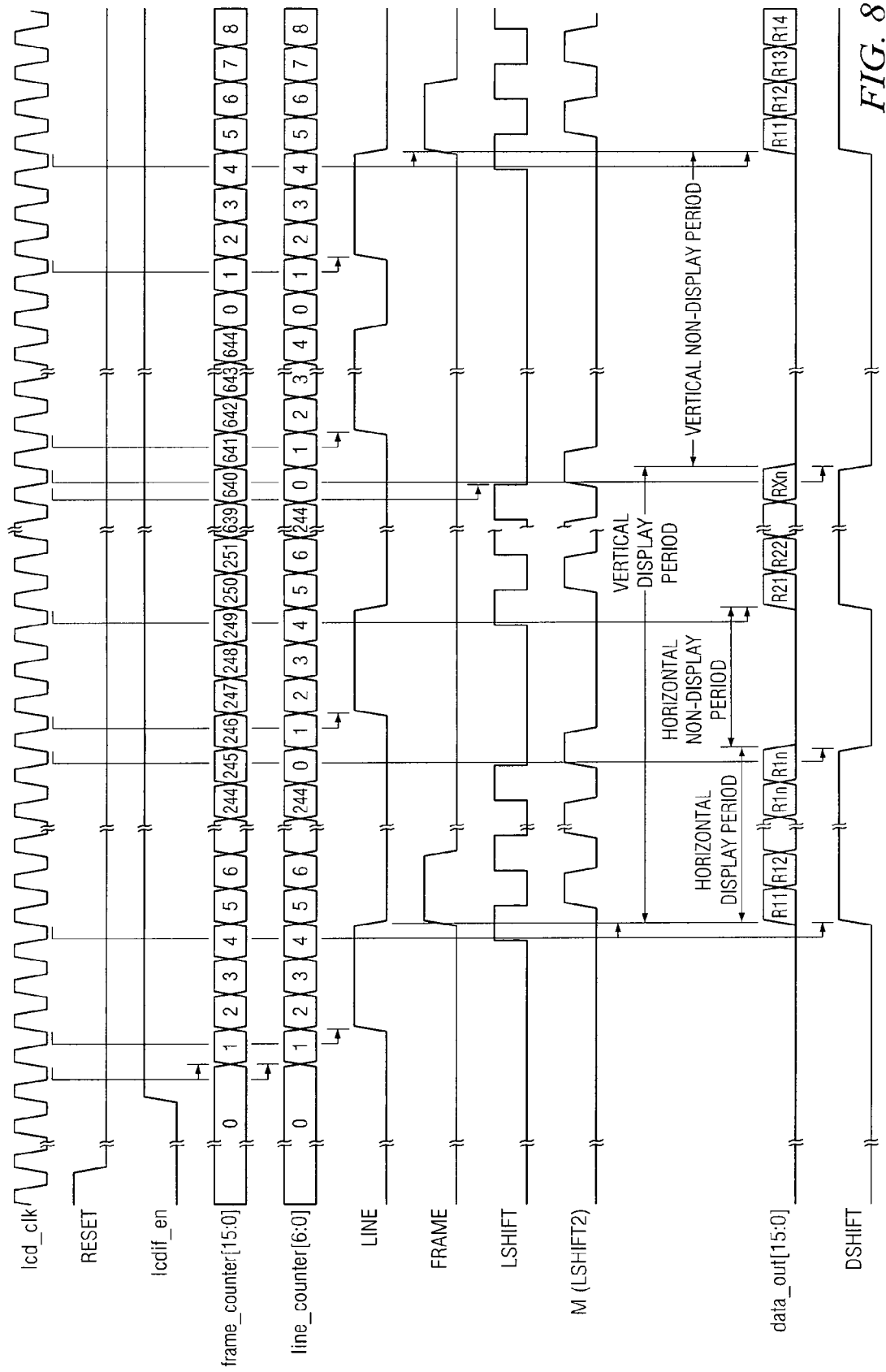
FIG. 8 is a timing diagram showing the output signals of the programmable cycle state machine in an embodiment programmed to drive a format 1 STN display with the shift bypass option disabled.

FIG. 8 depicts the signal timing, as programmed, for a STN format 1 display with shift_bypass_en=0. The input mod_rate is disregarded in this display type. Here, the lshift output is active just before the horizontal display period begins and toggles on each lcd_clk signal during that period. The waveform on the M output, functionally called LSHIFT2, is substantially the same as lshift except that it is 180 degrees out of phase.

Figure 9:
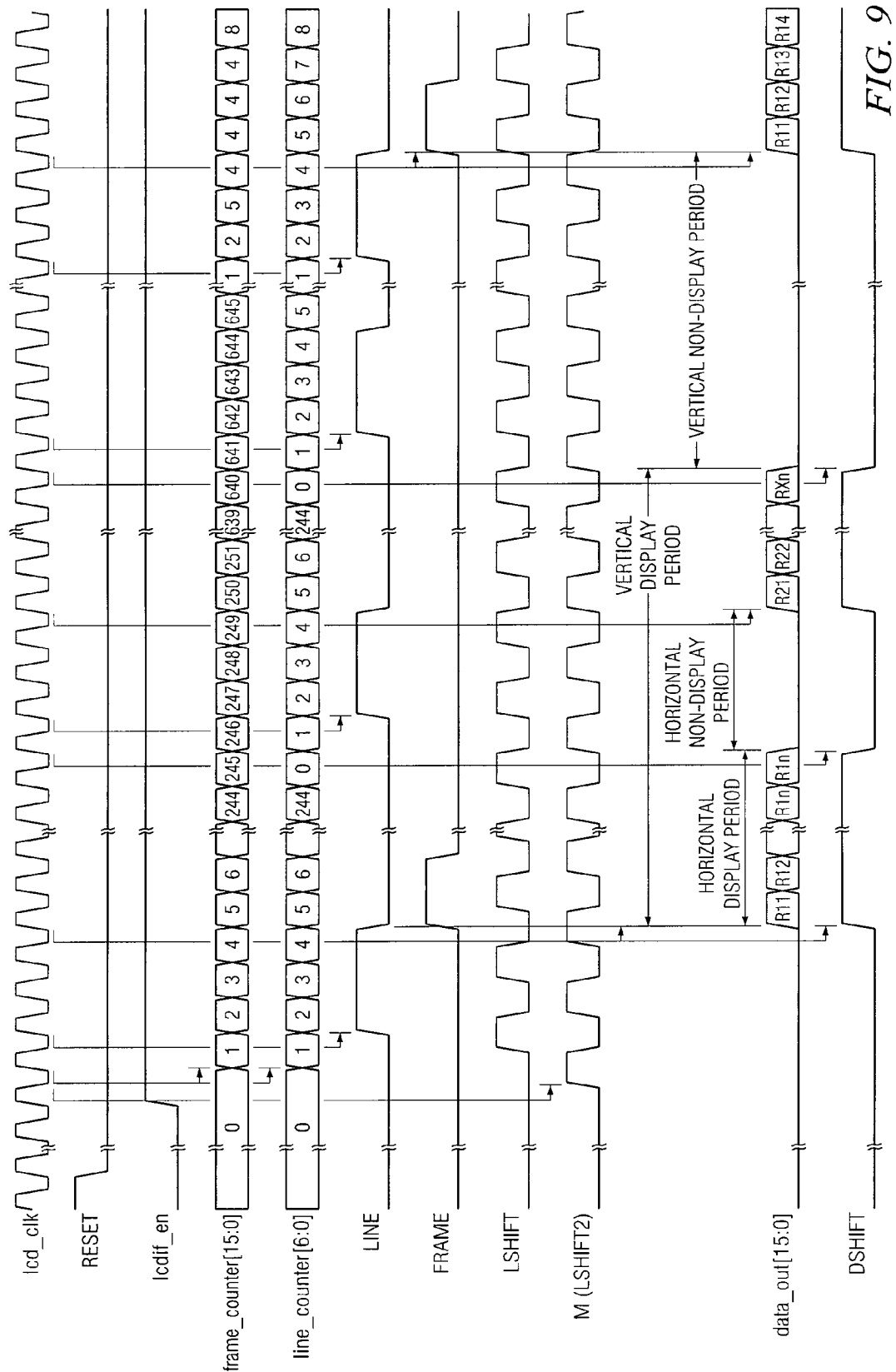
FIG. 9 is a timing diagram showing the output signals of the programmable cycle state machine in an embodiment programmed to drive a format 1 STN display with the shift bypass option enabled.

FIG. 9 depicts the signal timing, as programmed, for a STN format 1 display with shift_bypass_en=1. Here, the M output, representing LSHIFT2, goes high with lcdif_en and toggles each lcd_clk cycle. The lshift output is the same waveform, but phase shifted 180°.

Figure 10:
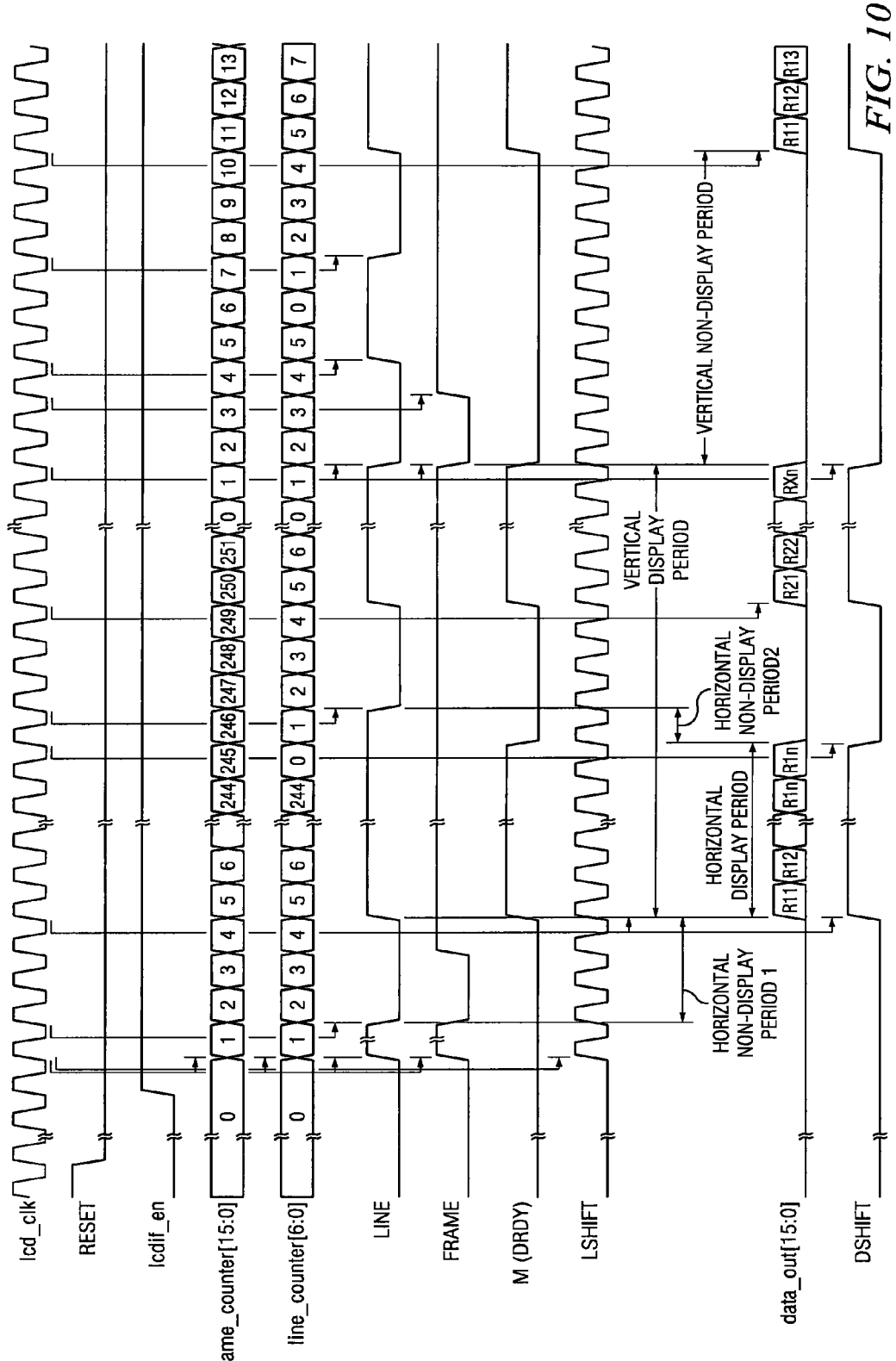
FIG. 10 is a timing diagram showing the output signals of the programmable cycle state machine in an embodiment programmed to drive a thin film transistor display.

FIG. 10 depicts the signal timing, as programmed, for a TFT display. In this display type, the inputs shift_bypass_en and mod_rate are disregarded. The M output, functionally called DRDY, goes high only during active data transfer cycles, or only during horizontal display periods. The frame output has reversed polarity here as well, because dtype [1:0]='1'.

Figure 11:
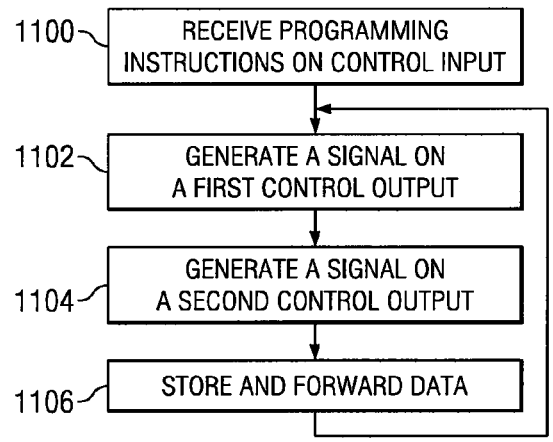
FIG. 11 is a block diagram of the steps required to drive a graphics display according to one embodiment of the programmable cycle state machine.

FIG. 11 depicts the steps performed in the method of using a programmable cycle state machine to drive a video display. Step 1100 is a step for receiving programming instructions on a control input. Step 1102 is a step for generating a signal on a first control output. Step 1104 is a step for generating a signal on a second control output. Step 1106 is a step for storing and forwarding video data.

FIG. 12 depicts a typical color liquid crystal display panel 1200 indicating the layout of pixels 1202. The rows and columns are sequentially numbered starting at an index value of one, though an actual implementation would likely start at zero as is customary with digital logic. Each pixel of a color LCD is implemented with three primary color channels that combine to produce a wide range of color values. In this exemplary figure, the primary colors are red, blue and green. Because each color in each pixel is represented by a different value, a 240×320 color pixel display is best represented as a 240×960 "monochrome" pixel display with alternating pixel colors. The actual implementation of the display controller may accept multiple bits of data per color per "monochrome" pixel or may accept only one. If the display controller only accepts one bit at a time, then the programmable cycle state machine will refresh the value of that "monochrome" pixel significantly more frequently than the human eye can sense changes in the displayed image to control the pulse width of that pixel. This will effectively control the intensity of that color in that pixel position and therefore allow the display of the desired color, which is represented by the microcontroller as a two, four, or eight bit color value. If the display controller accepts multiple bits per pixel, then the programmable cycle state machine need only send this multiple bit value once to generate the desired color.

FIG. 13 depicts a typical monochrome liquid crystal display panel 1300 indicating the layout of pixels 1302. As in FIG. 12, the rows and columns are sequentially numbered starting at an index value of one, though an actual implementation would likely start at zero as is customary with digital logic. Because it is a monochrome display, the microcontroller need only represent the video information as intensity.

Figure 14:
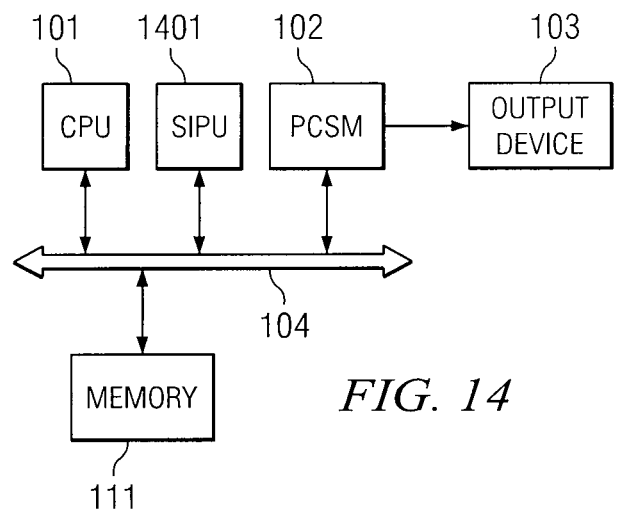
FIG. 14 is a block diagram showing the internal components of one embodiment of the microcontroller comprising a central processing unit, a special instruction processing unit, a memory, and a programmable cycle state machine that can be operably connected to an output device.

FIG. 14 depicts a block diagram showing the internal components of one embodiment of the microcontroller comprising a central processing unit 101, a special instruction processing unit 1401, a memory 111, and a programmable cycle state machine 102 that can be operably connected to an output device 103. In this embodiment, CPU 101 retrieves instructions and data from memory 111 over the shared data bus 104. The CPU then dispatches commands to SIPU 1401 as needed. SIPU 1401 in turn executes these commands by manipulating data values directly in memory 111. PCSM 102 independently, but based on configuration instructions from CPU 101, continuously reads data from a block within memory 111 and outputs this data, along with any needed control signals, to output device 103. The configuration instructions control the timing of this data transfer to conform to the input requirements of output device 103. One of ordinary skill in the art would recognize that shared data bus 104 could be more than one bus and each device attached to that bus might have more than one data port. Thus CPU 101 could access memory 111 via a dedicated port while SIPU 1401 and PCSM 102 would use a different port into memory 111. Conceivably, memory 111 could have three ports and provide direct, independent access to each of CPU 101, SIPU 1401 and PCSM 102.

Figure 15:
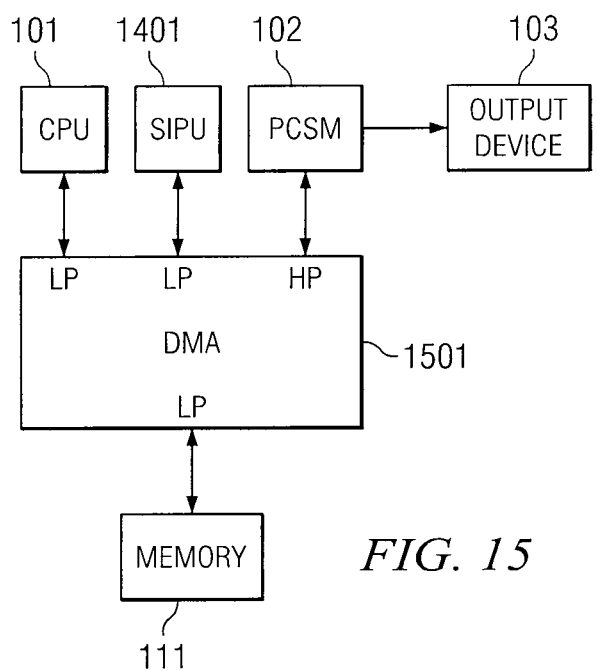
FIG. 15 is a block diagram of an embodiment of a microcontroller comprising the elements illustrated in FIG. 14 but with a direct memory access component connecting the elements of the microcontroller.

FIG. 15 is a block diagram of an embodiment of a microcontroller comprising the elements illustrated in FIG. 14 but with a direct memory access component 1501 connecting the elements of the microcontroller rather than shared bus 104. DMA 1501 provides a port to each of CPU 101, SIPU 1401, memory 111 and PCSM 102. As with the embodiment depicted in FIG. 14, CPU 101 may connect directly to memory 111 via a second memory port. However, this embodiment requires SIPU 1401, memory 111 and PCSM 102 to connect to ports on DMA 1501. DMA 1501 performs block data transfer operations to optimize the data flow within the microcontroller. PCSM 102 will typically give one instruction to DMA 1501—read the contents of the video buffer—and will transfer that data to output device 103 according to its input timing requirements. This exact instruction will then be repeated indefinitely in the case of an output display such that display 103 continually refreshes its display of the logical graphics or video data representation within memory 111. In the case of audio output, PCSM 102 may repeatedly request data from buffer in a fixed location within memory 111 or may request data from sequential blocks of audio data stored in memory 111.

SIPU 1401 issues more complex instructions to DMA 1501 and may access data from more than one low priority port 1505. For example, CPU 101 may instruct SIPU 1401 to apply a constant filter to a block of image data. SIPU 1401 would then make a read request on a first low priority port 1505 for that block of image data. SIPU 1401 would apply the filter to each datum and then deliver that datum to a second low priority port 1505 as part of a write request to the same block of image data. Thus DMA 1501 would be performing simultaneous read and write operations. Note that the write operation would occur after a delay of at least the same number of clock cycles that as is required to perform the filter operation within SIPU 1401. In another example, CPU 101 may instruct SIPU 1401 to apply a two dimensional mask to a block of image data. In this example, SIPU 1401 might connect to three low priority ports 1505 on DMA 1501. One low priority port 1505 would be used to issue a read command to DMA 1501 for the block of image data while a second low priority port 1505 would be used to issue a read command for the block of data storing the two dimensional mask. SIPU 1401 would apply the mask using a logical AND, OR or XOR to combine the current pixel in the mask with the current pixel of the image data and send the resulting pixel information to the third low priority port 1505 as part of a write request to DMA 1505 for the same block of image data. Alternatively, a single DMA port could be used if combined with a register bank to store the operands and result of each logical operation.

CPU 101, SIPU 1401 and memory 111 each connect to low priority ports 1505 and PCSM 102 connects to high priority port 1503. This reflects the nature of the tasks to be performed by each of these modules. The modules connected to low priority ports 1505 are not performing real-time sensitive tasks and can function properly even with a delay of a few CPU cycles. In contrast, PCSM 103 performs the real-time sensitive task of providing data to a external output device 103. Output device 103 has input timing requirements that cannot be violated without creating human discernable output errors. For example, where output device 103 is an LCD, delayed arrival of data could cause visual artifacts such as misaligned pixels, blank pixels, and the like. An LCD device must refresh at a specific rate due to the transient nature of the physical elements comprising each pixel. If output device 103 is an digital to analog converter to produce audio, delayed arrival of data could cause shifts in pitch, pops, or unintended silence. For these reasons, requests for data from memory 111 by PCSM 102 via high priority port 1503 preempt any requests on any of the low priority ports 1505. Once the high priority request has been processed, the requests on the low priority ports 1505 are resumed. Requests on the low priority ports 1505 may be handled using any arbitration scheme including round robin scheduling.

Figure 16:
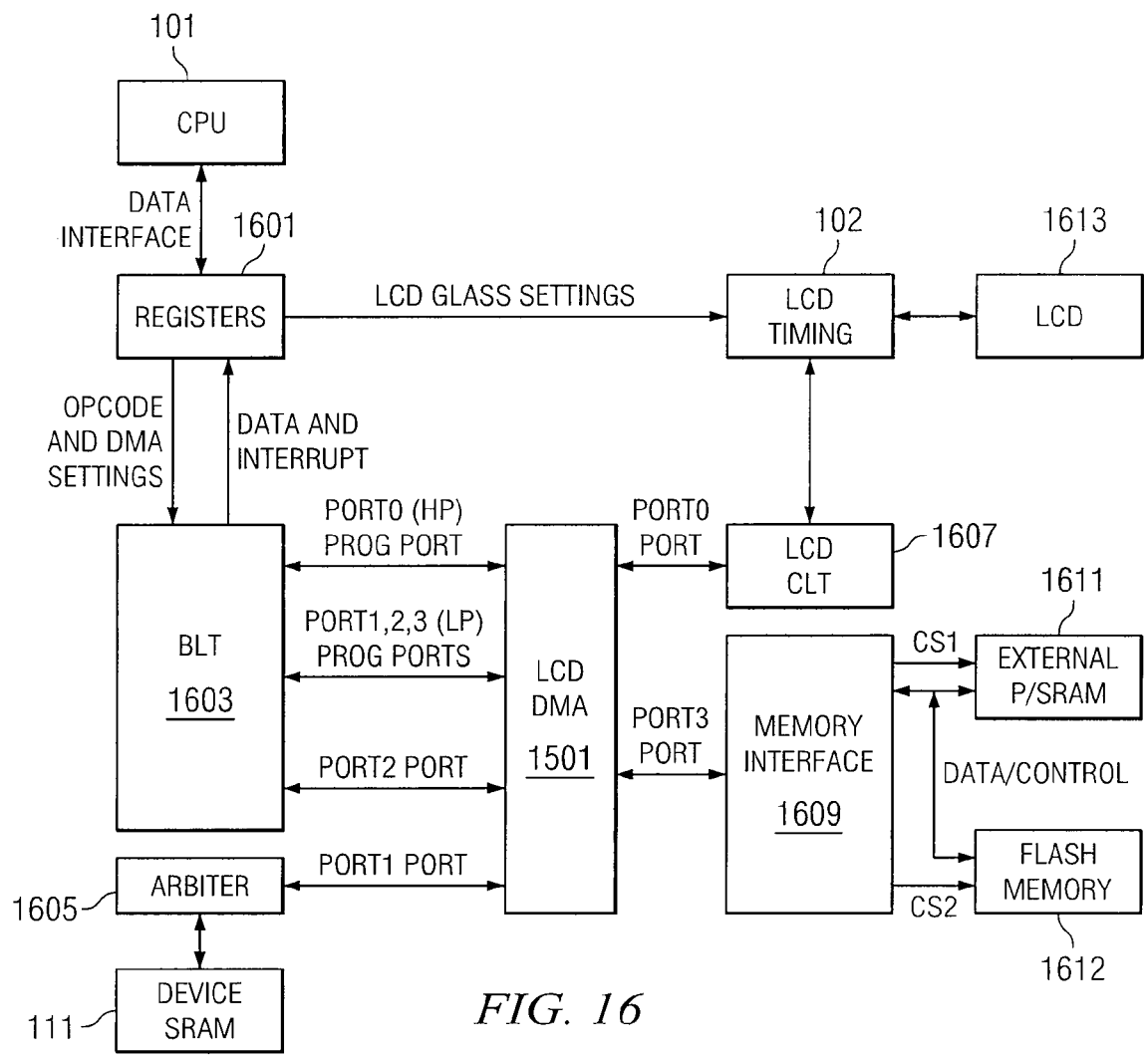
FIG. 16 is a block diagram showing the internal components of one embodiment of the microcontroller comprising a special instruction processing unit, a direct memory access component, the programmable cycle state machine, a color lookup table and two memory interfaces.

FIG. 16 is a block diagram showing the internal components of one embodiment of the microcontroller comprising CPU 101. Registers 1601 store configuration settings for LCD timing module 102 as well as opcode and DMA settings for bit blitter (BLT) 1603. BLT 1603 provides control signals to LCD DMA 1501 and performs graphics specific data processing operations independent, but under the direction of, CPU 101. Graphics data is transferred from DMA 1501 to color lookup table 1607 to be mapped into a larger color space before LCD Timing 102 relays that data to LCD 1613. Memory interface 1609 provides a mechanism for transfer of data between DMA 1501 and any number of external memory devices, possibly including external P/SRAM 1611 and flash memory 1612. Arbiter 1605 provides an interface between DMA 1501 and device memory 111. DMA 1501 accepts at least one basic command for each port that includes a source port and a destination port, a start address and a count of memory words to transfer. DMA 1501 also includes an arbitration mechanism for handling competing requests by multiple ports. This arbitration mechanism in its most basic implementation allows for the interruption of a request by a low priority port (ports 1, 2, and 3 in this figure) when a request is made by the high priority port (port 0). This is necessary as the high priority port feeds the real-time LCD timing module 102. Once the high priority request has been satisfied, the low priority request is resumed.

Figure 17:
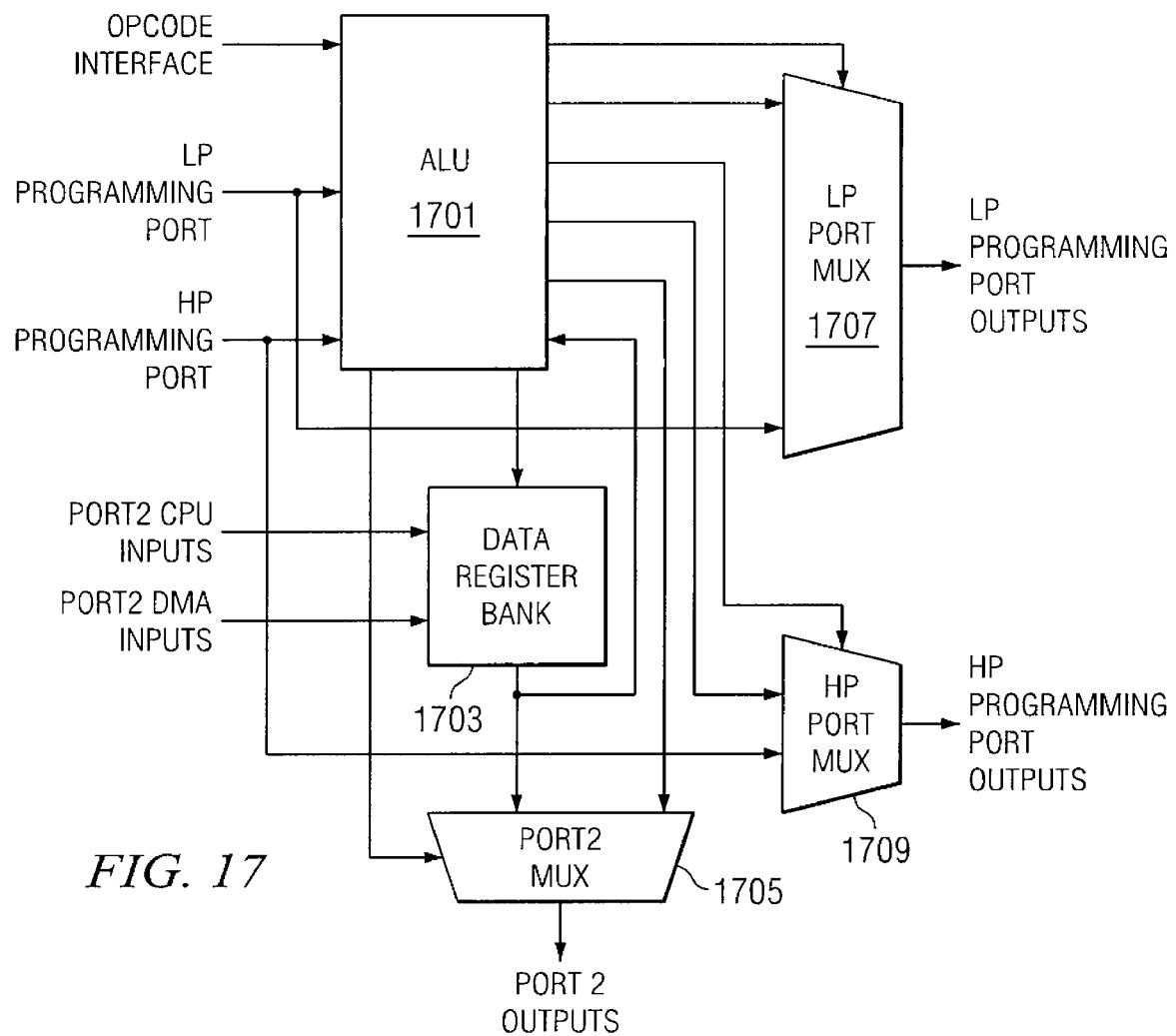
FIG. 17 is a block diagram showing the internal components of one embodiment of the special instruction processing unit comprising an arithmetic logic unit, a register bank and various multiplexers.

FIG. 17 is a block diagram showing the internal components of one embodiment of the special instruction processing unit comprising an arithmetic logic unit (ALU) 1701. ALU 1701 receives instructions at the opcode interface and has visibility into the DMA 1501 (not shown) programming instructions from the CPU 101 (not shown) as well. Register bank 1703 provides internal storage of operands and results for use by ALU 1701. Values may arrive from Port 2 CPU inputs or Port 2 DMA inputs and values may then be transferred via the Port 2 multiplexer 1705 to DMA 1501 (not shown) or CPU 101 (not shown). Low priority port multiplexer 1707 and high priority multiplexer 1709 allow the DMA to receive port programming instructions from CPU 101 (not shown) or from ALU 1701. Port 2 multiplexer 1705 selects the appropriate output from the set of registers 1703 and the direct output of ALU 1701. This embodiment illustrates how the ALU may operate using a single DMA port using register bank 1703 as a temporary data store.

Although the present invention and its advantages have been described in detail, it should be understood that various changes, substitutions and alterations can be made herein without departing from the spirit and scope of the invention as defined by the following claims.

What is claimed is:

1. A microcontroller integrated circuit comprising:
    a first central processing unit (CPU);
    a memory;
    a programmable cycle state machine;
    a special instruction processing unit (SIPU) comprising an opcode interface, wherein the SIPU is operable to read and write data to said memory and to receives instructions directly from the CPU through said opcode interface and comprises an arithmetic logic unit (ALU) and a register bank coupled with the ALU;
    a connection to an output device;
    wherein the SIPU manipulates multiple values in the memory responsive to a command from the CPU by means of said ALU and register bank;
    wherein the programmable cycle state machine continuously transfers data from the memory to the output device; and
    wherein the programmable cycle state machine periodically transmits a control signal to the output device to coordinate the data transfers with the input timing requirements of the output device.

2. The microcontroller according to claim 1,
    wherein the output device is a liquid crystal display (LCD),
    wherein bit-depth of the LCD is between 1 bit and 16 bits,
    wherein each pixel is represented by one value or three values, and
    wherein the geometry of the LCD is between 64 by 64 pixels and 854 by 480 pixels.

3. The microcontroller according to claim 1, wherein the CPU has a data path no wider than 16-bits and performs fewer than 60 million instructions per second.

4. The microcontroller according to claim 1, wherein the programmable cycle state machine supports the control signal timing required by at least four different graphics display technologies from a set consisting of:
    monochrome liquid crystal display (LCD),
    color super twisted nematic (STN) liquid crystal display,
    double-layer super twisted nematic (DSTN) liquid crystal display,
    color thin-film transistor (TFT) liquid crystal display,
    zero-power bistable display,
    plasma display,
    liquid crystal on silicon device,
    digital micromirror device,
    light-emitting diode panel,
    organic light-emitting diode (OLED) display.

5. The microcontroller according to claim 1, further comprising a direct memory access (DMA) controller with one high priority port and at least three low priority ports,
    wherein the high priority port of the DMA controller is connected to the programmable cycle state machine;
    wherein a first low priority port of the DMA controller is connected to the memory and a second and third low priority port of the DMA controller is connected to the SIPU.

6. The microcontroller according to claim 1, wherein the SIPU is operable to perform block transfer operations by means of a block transfer instruction.

7. The microcontroller according to claim 6, wherein the SIPU can perform the logical operations of XOR, OR, and AND.

8. The microcontroller according to claim 6, wherein a SIPU instruction set includes a background fill operation, a pixel set operation, and a line draw operation.

9. The microcontroller according to claim 8, wherein the SIPU instruction set includes a picture-in-picture operation.

10. The microcontroller according to claim 5, further comprising a color lookup table (CLT) between the DMA controller and the programmable cycle state machine.

11. A microcontroller integrated circuit comprising:
    a central processing unit (CPU),
    memory,
    a special instruction processing unit (SIPU) comprising an opcode interface, wherein the SIPU receives instructions directly from the CPU through said opcode interface and comprises an arithmetic logic unit (ALU) and a register bank coupled with the ALU,
    a programmable cycle state machine, and
    a direct memory access (DMA) controller comprising four ports coupled to said CPU, memory, SIPU, and programmable cycle state machine, respectively;
    wherein processing of output data stored in said memory is performed by the SIPU by means of said ALU and register bank and said programmable cycle state machine outputs said output data stored in said memory to an external device, freeing CPU cycles for other tasks.

12. The microcontroller according to claim 11, wherein a SIPU instruction set includes the logical operations of XOR, OR and AND.

13. The microcontroller according to claim 11, wherein a SIPU instruction set includes a background fill operation, a pixel set operation, and a line draw operation.

14. The microcontroller according to claim 11, further comprising a color lookup table.

15. The microcontroller according to claim 11, wherein the SIPU interfaces with at least two ports on the DMA controller.

16. A microcontroller integrated circuit comprising:
    a 16-bit central processing unit (CPU), memory, a special instruction processing unit (SIPU) comprising an opcode interface, wherein the SIPU receives instructions directly from the CPU through said opcode interface and comprises an arithmetic logic unit (ALU) and a register bank coupled with the ALU, a programmable cycle state machine, and a direct memory access (DMA) controller comprising first and second, third and fourth ports coupled with the CPU, SIPU, said memory, and said programmable cycle state machine, respectively;

wherein the memory stores display data and the microcontroller can display graphical information on a variety of sizes, color depths, and technologies of liquid crystal displays (LCD) using said CPU, memory, SIPU and said programmable cycle state machine, wherein the programmable cycle state machine provides the display data to said LCD, such that said CPU still has sufficient CPU bandwidth to respond in real-time to external interrupts.

17. The microcontroller according to claim 16,
wherein the output device is a liquid crystal display (LCD),
wherein bit-depth of the LCD is between 1 bit and 16 bits,
wherein each pixel is represented by one value or three values, and
wherein the geometry of the LCD is between 64 by 64 pixels and 854 by 480 pixels.

18. The microcontroller according to claim 17, wherein the CPU has a data path no wider than 16-bits and performs fewer than 60 million instructions per second.

19. The microcontroller according to claim 16, wherein the SIPU has read access to two ports on the DMA controller.

20. The microcontroller according to claim 19, wherein the SIPU has write access to a third port on the DMA controller.

* * * * *